3,832,217
PROCESS FOR FORMING EXTERIOR FINISH COATING FILMS FOR AUTOMOBILE BODIES
Kozo Sato, Eizo Nakatani, and Kiyoshi Ichimura, Hiroshima, Japan, assignors to Mitsubishi Rayon Co., Ltd., Tokyo, Japan
No Drawing. Filed Dec. 15, 1971, Ser. No. 208,404
Claims priority, application Japan, Dec. 15, 1970, 45/111,234
Int. Cl. B32b 15/08
U.S. Cl. 117—74
20 Claims

ABSTRACT OF THE DISCLOSURE

Coating composition for forming pigmented exterior finish coatings which comprise a thermosetting resin composition (I) comprising of about 40 to about 90 parts by weight of a thermosetting acrylic copolymer (A) having (a) a carboxylic acid hydroxyalkyl ester structual unit in which the hydroxyalkyl has 1-8 carbon atoms, (b) a carboxylic acid amide structual unit in which at least one hydrogen atom of the amide is substituted by a group represented by formula

wherein R and $R_1$ each represents a hydrogen atom or lower alkyl group having 1-8 carbon atoms, (c) a carboxylic acid structual unit and (d) another monomer structual unit different from (a), (b) and (c), (B) about 4 to about 50 parts by weight of aminoplast resin and (C) about 30 parts by weight or less of cellulose acetate butyrate in which the total amount is 100 parts by weight, and a coloring pigment (II). Exterior coating films comprising an undercoating film of the above composition and a top clear coating film of a thermosetting acrylic resin composition (III) which comprises about 40 parts to 96 parts by weight of an acrylic copolymer (F) containing about 4 to about 30 parts by weight of a carboxylic acid hydroxylalkyl ester structual unit, about 15% by weight or less of a carboxylic acid amide structual unit in which at least a hydrogen in the amide is substituted by a group represented by the formula

wherein R and $R_1$ are hydrogen or a lower alkyl group having 1-8 carbon atoms and about 0.1% to about 10% by weight of a carboxylic acid structual unit, 4-50 parts by weight of aminoplast resin (G) and 30 parts by weight or less of cellulose acetate butyrate (H). A process for forming an exterior finish coating comprising applying a pigmented enamel (I) comprising a thermosetting acrylic resin composition (D) and a coloring pigment (II) to a substrate treated with a primer, setting, applying a thermosetting acrylic resin composition (III), and thereafter baking the coated substrate at a temperature and for a time sufficient to crosslink said thermosetting resins.

BACKGROUND OF THE INVENTION

Field of the Invention

The present invention relates to coating compositions suitable for forming finish coating films having excellent appearance on the body of, particularly, motor cars, and to a process for forming the finish coating films.

Description of the Prior Art

Hitherto, as finish coating materials for the bodies of cars, thermoplastic acrylic lacquers and thermosetting coating materials comprising alkyd resins, acrylic resins having hydroxyl groups and carboxyl groups, and acrylic resins having carboxyl groups and carboxylic amide groups, have been known.

Thermoplastic acrylic lacquer coating films have a brilliant color; it is possible to gloss them by polishing the coating films and the coating films have high gloss retention. However, these lacquers have faults, e.g., the appearance of the coating films is easily injured by occurrence of orange peel on the surface of the coating films and the pigment in the coating films remains in the uncovered state on the surface by polishing. Accordingly in outdoor use such as on the body of a car, damage and stain occur due to the uncovered pigment, and the practical use of such films is remarkably lessened. This phenomenon is especially encountered when finish coating films are formed using color enamels, especially metallic color enamels.

The thermosetting alkyd resins and coating materials containing the above-mentioned thermosetting acrylic resins, have film properties, e.g., hardness, chemical resistance and water resistance, which are superior to those of coating materials containing thermoplastic resins. However the resulting coating films also have serious faults, e.g., they have inferior color tone and are lacking in gloss, and repair of the coating film is very difficult. Repairing a defect in a thermosetting film is usually carried out by removing the defective portion by sanding and applying a repair coating thereto. However, the property of the repaired part is different from that of the unrepaired part, and appearance is injured by a difference in color tone between the repaired part and the unrepaired part. In the case of using a color pigment, especially a metallic color pigment, damage and staining are easily brought about.

In order to resolve the above-mentioned disadvantages, a method has been proposed which comprises applying a thermoplastic polymethyl methacrylate lacquer after an enamel composed of a thermosetting polycarboxylic acid amide resin and pigments is applied and baked. According to this method, though scratch resistance and stain resistance of the pigmented coating films formed are remarkably improved as compared with prior coating films, they are not satisfactory for a number of reasons. Firstly they are unsuitable for application to articles which should be exposed to a high temperature, such as car bodies, because a high temperature (above 170° C.) is required for curing of the pigmented enamel layer. The second point is that the coating films are lacking in gasoline resistance, stain resistance and chemical resistance, since the clear films formed on the pigmented enamel layers are composed of thermoplastic resins.

In order to improve this second point, conventional thermosetting polycarboxylic acid amide resins have been used instead of the polymethyl methacrylate lacquer in the above-mentioned method. However, the coating films thus formed are lacking in adhesion between the pigmented enamel layer and the clear layer, and consequently it is difficult to form pigmented coating films having excellent performance, since the clear layer separate from the pigmented layer by impact or by the attack of chemicals and water. Further, in order to carrying out this method, two baking processes are required, that is, a baking of the pigmented enamel layer and a baking of the clear layer, which means the method is economically disadvantageous. To improve these fauts, there is a method which comprises providing a pigmented enamel layer which is to be cured, providing a clear layer thereon and baking them at the same time to form a cured finish coating film. The worst fault of this method is that mottling is caused in the coating film by migration of the pigment at the step of forming the clear layer on the pigmented enamel layer or at the step of baking the coating film because of there being a lack of affinity between the coating materials and the pigments which form the pigmented enamel layer and the orientation of the pigment in the pigmented enamel layer. Consequently, it is difficult to form an exterior finish coating film on car bodies having an excellent appearance.

SUMMARY OF THE INVENTION

As a result of studies on coating materials for forming coating films having excellent performance, that is, good affinity with pigments, good orientation stability of the pigment existing in the formed films even though using undesirable pigments comprising metallic color pigments or other color pigments, and studies on processes for forming exterior finish coating films for car bodies having excellent appearance in which the disadvantages and faults described above are remarkably improved, the inventors have completed the present invention.

The first aspect of the present invention relates to coating compositions for forming exterior finish coating films on the outomobile bodies which comprises a resin component (I) composed of 40–90 parts by weight of a thermosetting acrylic copolymer (A) having as the polar functional group a carboxylic acid hydroxyalkyl ester structural unit in which the alkyl group has 1–8 carbon atoms (a), a carboxylic acid amide structural unit (b) in which at least one of the hydrogen atoms in the carboxylic acid amide is substituted for by a group represented by the formula

(wherein R and $R_1$ each represents a hydrogen atom or an alkyl group having 1–8 carbon atoms), a carboxylic acid structural unit (c) and another monomer structural unit different from (a), (b) and (c), 4–50 parts by weight of an aminoplast (B) and 30 parts by weight or less of cellulose acetate butyrate (C), the total amount being 100 parts by weight, and a coloring pigment (II).

The second aspect of the present invention relates to a process for forming the exterior finish coating films on a car body having excellent appearance and good film performance which comprises applying a pigmented coating material comprising the above-mentioned coating composition to a substrate which has previously been coated with a primer, setting (which means to form the pigmented film to be cured), and then applying a clear coating material containing a thermosetting acrylic resin as the main component thereon, and thereafter baking.

One object of the present invention is to provide pigmented coating compostions suitable for forming exterior finish coating films on car bodies which comprise a thermosetting resin having a specified chemical structure and pigments.

Another object of the invention is to provide a process for forming such coating films which comprises applying the above-mentioned pigmented coating compositions to the body of a car to form films to be cured, applying non-pigmented acrylic coatings thereto and carrying out one baking treatment (hereinafter) the method for forming cured coating films by two applications and one baking treatment is called a 2 coat 1 bake system) to form exterior finish coating films having excellent appearance, good chemical resistance, good mechanical and physical properties and good weather-resistance.

DETAILED DESCRIPTION OF THE INVENTION

The thermosetting acrylic copolymer (A) composing the resin composition (I) used in the practise of the present invention is produced by copolymerizing vinyl monomers having a carboxylic acid hydroxyalkyl group containing 1 to 8 carbon atoms, vinyl monomers having a carboxylic acid group or a group derived therefrom, vinyl monomers having a carboxyl group and another copolymerizable vinyl monomer(s). This resin has the characteristic that it contains a functional group (b) in which at least one hydrogen atom of the amide group included in the copolymer is substituted for by a group represented by the formula

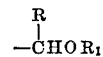

(wherein R and $R_1$ each represents the same meaning as described above), a carboxylic acid hydroxyalkyl ester group (a) and a carboxyl group (c) as the polar functional groups.

As the vinyl monomers containing a carboxylic acid hydroxyalkyl ester group used in the preparation of the copolymer (A), there are monoesters produced from α,β-monoethylenic unsaturated carboxylic acids and polyols. The carboxylic acids used include acrylic acid, methacrylic acid, itaconic acid, α-methylene glutaric acid, glutaric acid, maleic acid, fumaric acid and the like. Preferably, monocarboxylic acids are used. The polyols used include ethylene glycol, propylene glycol, 1,2-propylene glycol, 1,3 - butane diol, 1,4 - butane diol and 2-ethylhexylene glycol, 1-hexylpropane diol, 2,3-dihydroxypropanol and the like. The amount of the carboxylic acid hydroxyalkyl ester structural unit in the copolymer (A) is in a range of about 4% to about 30% by weight. Exterior finish coating films for the body of a car formed from a coating material containing a resin having less than about 4% by weight of the above structural unit have a low degree of cross-linking density and show a tendency to lack stain resistance, chemical resistance and water resistance, and the films are easily injured by soot and dust upon outdoor use. Further, coating films formed from a coating material containing a copolymer having above about 30% by weight of said structural unit have the faults that they become brittle because of a deterioration of the plasticity, have a degree of cross-linking density which is too high and show a tendency to lack chip resistance, the impact resistance thereof deteriorates, the adhesive property of the coating film to the substrate and particularly to the primer coating film deteriorates and the thermal flow property of the coating material at curing deteriorates, by which it is very difficult to form finish coating films having an excellent appearance. Therefore, the amount of the above monomer structural unit in the copolymer (A) is about 4% to about 30% by weight.

As illustrative of the vinyl monomers containing a carboxylic acid amide group of a group derived therefrom used in the preparation of copolymer (A), there are acrylamide, methacrylamide, itaconic acid amide, α-methylene glutaric acid amide, crotonic acid amide, fumaric acid amide, α-ethylacrylamide, N-methylol compounds of these carboxylic acid amides and alkoxyalkylated compounds of these carboxylic acid amides, for example, N-methoxymethylated compounds, N-ethoxymethylated compounds, N-butoxymethylated compounds, N-hexoxymethylated compounds and the like. Preferred results are obtained when the alkoxy group has 1–8, most preferably 1–4, carbon atoms. In such amide monomers, at least one amide hydrogen atom is N-alkoxyalkylated in the copolymer (A). When an α,β-monoethylenic unsaturated carboxamide is used as the starting substance, the amide group may be N-alkoxyalkylated by aldehydes and alcohols during or after polymerization of monomers. These preparation methods are described in U.S. No. 2,978,347, etc.

The N-alkoxyalkylamide structural unit (b) included in the resin composition (I) is a component which contributes to improving the affinity of the coloring pigment (II), the orientation of the pigment in the coating film, the orientation stability thereof, the adhesive property between the primer layer and the metallic color layer and between the metallic color layer and the clear layer, and compatibility with the aminoplast or cellulose acetate butyrate.

The amount of the above structural unit in copolymer (A) is preferably in the range of about 1% to about 15% by weight. When the amount of the above structural unit in the copolymer (A) is below about 1% by weight, the above-mentioned preferable effects are not exhibited. It is not preferred that the amount of the above structural unit be above about 15% by weight, though such may be used, although the coating film formed from a coating material containing a copolymer having a large amount of the above-structural unit requires a high temperature at hardening of the coating film.

As the carboxylic acid group containing vinyl monomers used at preparation of the copolymer (A), there are $\alpha,\beta$-monoethylenically unsaturated carboxylic acids such as acrylic acid, methacrylic acid, maleic acid, fumaric acid, itaconic acid, $\alpha$-methylene glutaric acid, aconitic acid and the like. This monomer unit is the component which accelerates heat crosslinking of the resin composition (I) containing copolymer (A), improves the affinity between coloring pigments and the resin composition (I) and improves the adhesive property between the coating film, the substrate and the clear coating layer.

The amount of the carboxylic acid structural unit in the copolymer (A) is in a range of about 0.1% to about 10% by weight and preferably about 0.3% to about 5% by weight. If the amount of this unit is below about 0.1% by weight, the above-mentioned effects are not exhibited. It is not preferred that the amount is above about 10% by weight because the coating film formed from such a resin has a tendency to be hard and brittle and the water resistance of the coating film becomes poor.

The vinyl monomer copolymerizable therewith used in preparation of the amide copolymer (A) includes monoester compounds obtained by reacting $\alpha,\beta$-monoethylenically unsaturated carboxylic acids with monohydric alcohols, wherein $\alpha,\beta$-monoethylenically unsaturated carboxylic acids comprising acrylic acid, methacrylic acid, maleic acid, itaconic acid, $\alpha$-methylene glutaric acid and aconitic acid can be used. The monohydric alcohols comprising methanol, ethanol, n-propanol, iso-propyl alcohol, n-butanol, iso-butanol, t-butanol, pentanol, 2-ethylhexanol, cyclohexanol, nonyl alcohol, decyl alcohol, dodecyl alcohol, stearyl alcohol and benzyl alcohol can be used. Additional examples of such vinyl monomers include acrylonitrile, methacrylonitrile, vinyl acetate, vinyl propionate, versatic acid vinyl ester, styrene, $\alpha$-methylstyrene, $\alpha$-chlorostyrene, vinyl toluene and the like.

The vinyl monomer(s) is used in an amount of from 45 to 94.9% by weight.

The amide copolymer (A) can be produced by combining each monomer in the above-mentioned ranges and polymerizing by a usual polymerization process, especially a solution polymerization process. As the polymerization catalyst, any substance can be used if it is used as the polymerization catalyst. For example, there are benzoyl peroxide, cumene hydroperoxide, tertiary-butyl peroxide, tertiary-butyl peroxy isopropyl carbonate, azoisobutyronitrile, azobisisovaleronitrile and the like. Chain transfer agents are generally used, e.g., tertiarydodecyl mercaptan, n-dodecyl mercaptan, butyl mercaptan, 2-mercapto-ethanol and the like. As the polymerization solvent, any substance can be used if it satisfies the requirements that the monomers used in the production of copolymer (A) dissolve therein at less than 150° C. and the solubility of copolymer (A) therein is good. For example, alcohols such as butanol and isopropanol, etc. and hydrocarbon solvents such as toluene, xylene and white spirits (trademark Solvesso) can be used.

In the case of using an $\alpha,\beta$-monoethylenically unsaturated carboxylic amide as the starting material for copolymer (A), substitution of the amide hydrogen atom included in the resulting polymer into an alkoxyamide group may be carried out by a dehydration condensation in the presence of a dehydration catalyst such as maleic anhydride and p-toluenesulfonic acid by adding an alcohol and an aldehyde or an addition product of alcohols and aldehydes when the conversion ratio in the polymerization step of the production of the copolymer (A) is more than about 60%, or after completion of the polymerization. (Described in U.S. Pat. No. 2,978,437 etc.)

As the aminoplast (B) used in the preparation of the resin composition (I) of the present invention, there are N-alkoxyalkyl melamines produced by etherizing with alcohols having 1 to 8 carbon atoms the condensates of aldehydes and urea, N,N'-ethylene urea or aminotriazine, and particularly, methylated melamine resins and butyrated melamine resins are preferably used. This component acts as the agent for improving characteristics such as hardness, chemical resistance and solvent resistance etc., of the coating film formed from resin composition (I), the amount of which in the resin composition (I)) is preferably about 4–50 parts by weight. If the amount is below about 4 parts by weight, it is difficult to obtain the desired properties of the coating film because of a lowering of the degree of cross-linking. When the amount used is above about 50 parts by weight, the coating film is brittle because of an excessive increase in the degree of cross-linking.

The preferred cellulose acetate butyrate used as component (c) in the resin composition (I), is one having a viscosity of 0.1–2.0 seconds determined by ASTM D-871–48. As available cellulose acetate butyrate derivatives, there are cellulose acetate butyrate EAB-503–0.2, EAB-451–1, EAB-531–1 and half second butyrate (trade name; produced by Eastman Chemical Product Co.). These cellulose derivatives prevent sagging, cratering, occurrence of uneven concentration and uneven disposition of the pigment in the coating films, and improve the dispersibility of the pigment in the resin composition and the adhesive property of the coating film to the base. The cellulose acetate butyrate is the component which exhibits an excellent effect in the case of using metallic color pigments or other colored pigments which easily cause uneveness in the pigment concentration and disposition of the pigment in the finish coating film.

The cellulose acetate butyrate is preferably used in an amount of about 2 parts to about 30 parts by weight in the resin composition (I). When the amount is below about 2 parts by weight, it is difficult to show the above-mentioned excellent effects. When the amount is above about 30 parts by weight, it is not preferred as seediness is caused on the surface of the coating film.

As the coloring pigment (II) used in the present invention, though many kinds of pigments can be used, the most preferred effect is exhibited upon using metallic colored pigments containing aluminium, copper and brass. As other colored pigments in this invention there are used the colored pigments containing titanium oxide, iron oxide, phthalocyanine blue, phthalocyanine green, quinacridone red, carbon black and the like. These pigments are blended with the resin composition (I) in a pebble mill, ball mill or mixer etc. to produce pigmented enamels. The pigment concentration is about 0.05% to about 65% by weight.

The coating materials for finishing the exterior of a car bodies obtained by the present invention exhibit the most preferred effect when colored pigments, especially metallic colored pigments, are used as the coloring agent. In the coating composition obtained by the present invention, the affinity to the above-mentioned pigments is superior to that of the conventional thermosetting coating materials, for example, alkyd coating materials, melamine coating materials, acrylic coating materials containing hydroxyalkyl ester groups and carboxylic acid groups and acrylic coating materials containing carboxylic acid amide groups. Accordingly, color separation is substantially absent during formation of the pigmented coating film. Further, since the orientation and orientation stability of the pigment in the coating film are remarkably improved, it is possible to form pigmented coating films having an excellent appearance. Furthermore, since the coating material used in the present invention exhibits excellent thermal flow mobility at the beginning of the heat-curing step, the finished coating films have excellent gloss and smoothness.

The second aspect of the present invention relates to a process for forming exterior finish coating films on car bodies in which films are composed of a combination of a pigmented layer which is formed from a pigmented enamel of the heretofore described composition and a clear layer which is formed from a thermosetting acrylic coating material applied thereon.

The clear layer used in practice of the second aspect of this invention is a cured coating film formed using a clear coating material (III) which comprises 40–96 parts by weight of a copolymer (F) obtained by polymerizing about 4% to about 30% by weight of an $\alpha,\beta$-monoethylenic unsaturated carboxylic acid hydroxyalkyl ester, about 15% by weight or less of an $\alpha,\beta$-monoethylenic unsaturated carboxylic acid amide or a derivative thereof, about 0.1% to about 10% by weight of an $\alpha,\beta$-monoethylenic unsaturated carboxylic acid and about 45% to about 95.9% by weight of another vinyl monomer copolymerizable therewith, the total amount being 100% by weight, 4–50 parts by weight of an aminoplast resin (G) and, if desired, 30% by weight or less of a cellulose acetate butyrate (H), the total amount being 100 parts by weight.

It is preferred for coating material (III) used in the practice of the second aspect of the present invention that the adhesive property to the pigmented enamel layer be excellent, the orientation stability of the pigment set in the pigmented enamel layer be not disturbed at formation of the clear layer, the gloss of the clear coating film be excellent, deterioration of the gloss, discoloration of the coating film and damage of the coating film by soot and dust are not caused even by outdoor use for long periods of time, and the properties of the coating film such as water resistance, alkali resistance and chemical resistance are excellent. In order to satisfy these requirements, it is preferred to use the above-mentioned monomers in the above-mentioned ranges for the copolymerization to produce the copolymer (F).

As the $\alpha,\beta$-monoethylenically unsaturated carboxylic acids, the hydroxyalkyl ester of said carboxylic acids, the amide of said carboxylic acids and derivatives thereof and another vinyl monomer copolymerizable therewith used in producing copolymer (F), the same monomers as in the case of producing the copolymer (A) may be used.

The amount of the copolymerizable hydroxyalkyl ester of the $\alpha,\beta$-monoethylenically unsaturated carboxylic acids used in production of the copolymer (F) should be in the range of about 4% to about 30% by weight. When the amount of said monomer in copolymer (F) is less than about 4% by weight, the thermosetting property of the coating material (III) containing this copolymer deteriorates and the stain resistance, chemical resistance and water resistance of the resulting coating film deteriorate. Consequently, when the car body is used outdoors, the finish coating film of the body of the car is easily injured by soot and dust. Further, the coating film formed from a coating material which contains a copolymer having above about 30% by weight of the above monomer has a high degree of cross-linking which leads to brittleness because of loss of plasticity. Consequently, it is not preferable, since anti-impact resistance and mar resistance of the coating film deteriorate.

The amount of the $\alpha,\beta$-monoethylenically carboxylic acid amide or derivative thereof used for producing copolymer (F) is preferably about 15% by weight or less. If such a monomer is subjected to copolymerization with other monomers to produce copolymer (F), though it is not always an indispensable component in the copolymer (F), the adhesive property of the coating material (III) containing copolymer (F) for the pigmented enamel layer is improved and the thermal flow property at formation of the coating film of the clear lacquer is improved, whereby coating films having excellent appearance can be formed. The amount of this monomer in copolymer (F) may be above about 15% by weight, but such is not preferred because cost of copolymer (F) is needlessly increased and the thermal curing temperature of the coating material becomes higher.

The amount of the $\alpha,\beta$-monoethylenically unsaturated carboxylic acid used in the production of copolymer (F) is in the range of about 0.1% to about 10% by weight, preferably about 0.3% to about 5% by weight. This is the component which acts as the heat cross-linking catalyst of the coating material (I) and improves the adhesive property to the pigmented enamel layer. However, if it is copolymerized in an amount of above about 10% by weight, the water resistance and the anti-corrosive property of the coating film formed from the coating material containing said copolymer deteriorate, and it becomes difficult to produce exterior finish coating films on cars having excellent properties.

As the aminoplast resin (G) and cellulose acetate butyrate (H) used for producing the coating material (III), the same kinds of substances as described for aminoplast resin (B) and cellulose acetate butyrate (C) used in the first aspect of this invention can be used.

The amount of the aminoplast resin (G) in the coating material (III) is preferably in the range of about 4–50 parts by weight. If the amount is out of this range, the characteristics of the resulting finish coating film, for example, hardness, plasticity, adhesive property and chemical resistance, deteriorate.

The cellulose acetate butyrate, which is not always necessary, may be used in an amount of less than 30 parts by weight, if disposition stability of the pigment is required at formation of the finish coating film. The use of above 30 parts by weight is not preferred, because the properties of the resulting coating film, such as chemical resistance and water resistance, deteriorate.

The formation of the exterior finish coating films on a car body is carried out by applying a pigmented coating composition produced in accordance with the first aspect of the present invention to a substrate treated with a primer, setting at a room temperature to 100° C. for approximately 1–10 minutes to form a pigmented enamel layer having thickness of 5–50μ, applying clear coating material (III) to the enamel layer, setting at a room temperature to 100° C. for 5–15 minutes, and then curing the formed coating film at 100–200° C. for 15–30 minutes to cause cross-linking. Preferably, coating of the enamelized layer and the clear layer is carried out by spray coating or electrostatic spray coating.

The temperature of the setting process at the formation of the pigmented enamel layer to be cured and the clear layer to be cured should be below about 100° C. to improve the orientation and orientation stability of the pigment in the coating film, to prevent the occurrence of popping of the coating film and to improve the adhesive property of each coating film. It is not preferred to use a temperature for the setting process above 100° C. because it is difficult to form coating films having excellent appearance because of migration of the orientated and fixed pigment in the coating film, whereby defects easily form in the coating film due to popping. Further, it is not preferred to use a temperature for the setting process below room temperatue because the film foming property of the coating film to be cured is insufficient, the film forming property of the clear coating film is insufficient and defects in the coating film are easily caused during the subsequent baking step.

The curing of the coating films composed of the pigmented enamel layer and the clear coating film layer is carried out at 100 to 200° C. and preferably 110 to 180° C. If the temperature is below 100° C., coating films having excellent chemical properties cannot be obtained because cross-linking of the coating films is not carried out sufficiently. Further, coating films having excellent appearance cannot be obtained, because the flow property of the coating film is inferior and the gloss of the resulting coating film deteriorates. If the temperature is above 200° C., it becomes difficult to form finish coating films having excellent characteristics, because popping occurs in the coating film at curing of the coating film, the coating film discolors or strain caused by heat remains in the resulting coating film.

The exterior finish coating films of the present invention having a double layer structure formed by the process of this invention have excellent appearance, excellent physical and chemical properties and especially excellent impact resistance, weather resistance, chemical resistance and stain resistance as compared to exterior finish coating films formed by conventional methods. The present invention is particularly effective in the case of using colored pigments especially metallic color pigments.

In the following examples, the present invention will be explained in more detail. However, these examples should not be considered as limitative of the invention.

Example A.—Production of Copolymer (I)

235 parts of n-butanol and 360 parts of xylene were charged into a 3-necked flask equipped with a stirrer, a thermometer and a reflux condenser and heated to 80° C. To this mixture, a mixture of the following materials was added dropwise throughout a 4 hour period to polymerize the mixture at boiling point.

| | Parts |
|---|---|
| 2-Hydroxyethyl methacrylate | 120 |
| N-Butoxymethyl acrylamide | 30 |
| Methacrylic acid | 30 |
| Methyl methacrylate | 480 |
| n-Butyl acrylate | 340 |
| t-Dodecyl mercaptan | 40 |
| Azobisisobutyronitrile | 7.5 |

1.2 hours and 3 hours after starting the polymerization 2.5 parts of azobisisobutyronitrile were added to the mixture, and further the mixture was heated for 2 hours at its boiling point. Then 375 pats of xylene were added thereto to prepare copolymer solution (I).

The resulting Copolymer solution (I) had the following properties: viscosity (Gardner-Holdt): —U; solids content: 50.2%; acid value: 9:6.

Hereafter all viscosity values are measured by Gardner-Holdt method.

Example B.—Production of Copolymer solution (II)

215 parts of n-butanol and 340 parts of xylene were charged into a flask equipped as in Example A. Copolymer solution (II) was produced by copolymerizing in the same manner as in Example A by adding dropwise the following materials.

| | Parts |
|---|---|
| 2-Hydroxyethyl methacrylate | 120 |
| N-butoxymethyl acrylamide | 70 |
| Methacrylic acid | 30 |
| Methyl methacrylate | 460 |
| n-Butyl acrylate | 320 |
| t-Dodecyl mercaptan | 45 |
| Azobisisobutyronitrile | 7.5 |

The resulting Copolymer solution (II) had the following properties: viscosity: +T; solids content: 49.8%; acid value: 9.5.

Example C.—Production of Copolymer solution (III)

235 parts of n-butanol and 360 parts of xylene were charged into a flask equipped as in Example A. Copolymer solution (III) was produced by copolymerizing in the same manner as in Example A by adding dropwise the following materials.

| | Parts |
|---|---|
| 2-Hydroxyethyl methacrylate | 150 |
| N-Butoxymethyl acrylamide | 30 |
| Methacrylic acid | 30 |
| Methyl methacrylate | 540 |
| Lauryl methacrylate | 250 |
| t-Dodecyl mercaptan | 50 |
| Azobisisobutyronitrile | 7.5 |

The resulting copolymer solution (III) had the following properties: viscosity: Y; solids content: 50.2%; acid value: 9.5.

Example D.—Production of Copolymer solution (IV)

A mixture of the following materials was charged into a flask equipped as in Example A and subjected to polymerizing by heating to 80° C.

| | Parts |
|---|---|
| n-Butanol | 250 |
| Xylene | 400 |
| 2-Hydroxyethyl methacrylate | 100 |
| Methacrylic acid | 25 |
| Styrene | 350 |
| Ethyl methacrylate | 130 |
| n-Butyl methacrylate | 295 |
| Lauryl methacrylate | 100 |
| Azobisisobutyronitrile | 6 |

Then, 350 parts of xylene were added thereto to produce Copolymer solution (IV).

The obtained Copolymer solution (IV) had the following properties: viscosity: +X; solids content: 50.7%; acid value: 8.0.

Example E.—Production of Copolymer solution (V)

A mixture of the following materials was charged into a flask and subjected to polymerization in the same manner as in Example D.

| | Parts |
|---|---|
| n-Butanol | 250 |
| Xylene | 250 |
| 2-Hydroxyethyl methacrylate | 100 |
| Methacrylic acid | 27 |
| Styrene | 290 |
| n-Butyl methacrylate | 350 |
| 2-Ethylhexyl methacrylate (containing 5 p.p.m. of hydroquinone) | 233 |
| Azobisisobutyronitrile | 7 |

500 parts of xylene were added thereto to produce Copolymer solution (V).

The obtained Copolymer solution (V) had the following properties: viscosity: WX; solids content: 49.4%; acid value: 8.3.

Example F.—Production of Copolymer solution (VI)

A mixture of the following materials was charged into a flask and subjected to polymerizing in the same manner as in Example D.

| | Parts |
|---|---|
| n-Butanol | 250 |
| Xylene | 480 |
| 2-Hydroxyethyl methacrylate | 100 |
| N-butoxymethyl acrylamide | 20 |
| Methacrylic acid | 50 |
| Styrene | 200 |
| Methyl methacrylate | 290 |
| n-Butyl methacrylate | 190 |
| 2-Ethylhexyl acrylate | 150 |
| t-Dodecyl mercaptan | 20 |
| Azobisisobutyronitrile | 6 |

250 parts of xylene were added thereto to produce Copolymer solution (VI).

The obtained Copolymer solution (VI) had the following properties: viscosity: WX; solids content: 50.5%, acid value: 15.7.

Example G.—Production of Copolymer solution (VII)

A mixture of the following materials was charged into a flask and subjected to polymerizing in the same manner as in Example D.

| | Parts |
|---|---|
| n-Butanol | 200 |
| Xylene | 530 |
| 2-Hydroxypropyl methacrylate | 150 |
| N-butoxymethyl acrylamide | 20 |
| Methacrylic acid | 7 |
| Styrene | 353 |
| i-Butyl methacrylate | 140 |
| 2-Ethylhexyl methacrylate | 330 |
| Azobisisobutyronitrile | 6 |

250 parts of xylene were added thereto to produce Copolymer solution (VII).

The obtained copolymer solution had the following properties: viscosity: +T; solids content: 49.6%; acid value: 22.

Example H.—Production of Copolymer solution (VIII)

250 parts of n-butanol and 375 parts of xylene were charged into a flask equipped as in Example A. Copolymer solution (VIII) was produced by polymerizing in the same manner as in Example A by adding dropwise a mixture of the following materials.

| | Parts |
|---|---|
| 2-Hydroxyethyl methacrylate | 120 |
| Methacrylic acid | 30 |
| Methyl methacrylate | 500 |
| n-Butyl acrylate | 350 |
| t-Dodecyl mercaptan | 35 |
| Azobisisobutyronitrile | 7.5 |

The obtained Copolymer solution (VIII) had the following properties: viscosity: —U; solids content: 50.2%; acid value: 9.6.

Example I.—Production of Copolymer solution (IX)

A mixture of the following materials was charged into a flask and subjected to polymerizing in the same manner as in Example D.

| | Parts |
|---|---|
| n-Butanol | 200 |
| Xylene | 550 |
| 2-Hydroxypropyl methacrylate | 150 |
| Methacrylic acid | 7 |
| Styrene | 353 |
| t-Butyl methacrylate | 140 |
| 2-Ethylhexyl methacrylate | 350 |
| Azobisisobutyronitrile | 6 |

250 parts of xylene were added thereto to produce Copolymer solution (IX).

The obtained Copolymer solution (IX) had the following properties: viscosity: ST; solids content: 48.9%; acid value: 2.2.

Example 1

Using Copolymer solution (I) which contained the N-butoxymethyl amide group and Copolymer solution (VIII), resin solutions were prepared by mixing to have a ratio, by weight of copolymer:half second butyrate [1]:methoxy methyl melamine [2]=70:15:15 (ratio of solids content). These solution were applied to glass plates and baked at 140° C. for 30 minutes. As a result of examinations of the transparency of the resulting cured coating films, it was found that the transparency of the coating film formed from the resin solution containing Copolymer solution (I) was superior, but the transparency of the coating film formed from the resin solution containing Copolymer solution (VIII) was inferior. It was concluded from this result that the compatibility of each polymer in the resin composition of the present invention was excellent.

Example 2

Using Copolymer (VII) which contained N-butoxymethyl amide groups and Copolymer (IX) which did not contain amide groups, resin solutions were prepared by mixing to have a ratio of copolymer:isobutoxymethyl melamine resin [3]=75:25 (ratio of solids content). Cross-linked films were formed in the same manner as in Example 1. As a result of examining the transparency of these films, it was found that the film formed from the resin solution containing Copolymer solution (VII) was transparent. This fact meant the compatibility of the Copolymer (VII) to the melamine was good. The film formed from the resin solution containing Copolymer (IX) was slightly opaque. This meant the compatibility was insufficient.

Example 3

Using Copolymer solution (I) which contained N-butoxymethyl acrylamide groups and Copolymer solution (VIII), which did not contain amide groups, blue enamels were prepared in the following manner and the precipitation stability of the pigment in these enamels was examined.

| Charge to a pebble mill: | Part |
|---|---|
| Phthalocyanine blue GFN* | 2 |
| Copolymer solution (VIII) or (I) | 10 |
| Xylene | 4 |

After grinding for 24 hours, the following materials were additionally added.

| | |
|---|---|
| Copolymer solution (VIII) or (I) | 70 |
| Xylene | 14 |

* Produced by Dainippon Ink and Chemicals, Inc.

A thinner [4] was added to the above mentioned blue enamels to adjust the solids content to 35%. After storage at 20° C. for one month in a precipitation tube at a 30 cm. liquid height, no change was observed in the enamel solution containing Copolymer solution (I). However, the pigment precipitated approximately 1 mm. from the top in the enamel solution containing Copolymer solution (VIII).

Example 4

A pigmented enamel was prepared in the following manner using Copolymer solution (I) as the base. The following components were mixed.

| | Parts |
|---|---|
| Blue paste [1] | 140.0 |
| Al-paste 1109MA [2] | 27.0 |
| Cellosolve acetate | 80.5 |
| Copolymer solution (I) | 402.5 |
| Cellulose acetate butyrate (Half second butyrate which concentration is 20% by weight) | 262.5 |
| Methoxy methyl melamine resin (which is a 60% solution) | 87.5 |

The resulting pigmented enamel had a solids content ratio of blue pigment-aluminium pigment-vehicle=1:1:20.

[1] Blue paste:

| | Parts |
|---|---|
| Phthalocyanine blue GFN | 20 |
| Copolymer solution (I) | 100 |
| Xylene | 40 |

The above-mentioned components were ground for 24 hours.
[2] Al-paste 1109MA—Produced by Toyo Aluminum Co., Solids content: 65%.

---

[1] Solution prepared by dissolving 20 parts of half second butyrate in a mixture of 40 parts of xylene, 28 parts of methylisobutyl ketone and 12 parts of n-butanol.
[2] NIKALAC MS-11 (trademark: which is methoxy methyl melamine solution: solids content: 60%): produced by Nippon Carbide Industries, Co., Ltd.

[3] U-VAN 60R (which is isobutoxymethyl melamine solution; trademark: solids content: 50%) produced by Mitsui Toatsu Chemical Inc.
[4] The thinner was prepared by mixing 20 parts of toluene, 35 parts of xylene, 10 parts of butyl Cellosolve and 15 parts of Solvesso #150.

A clear coating material was prepared by mixing following materials:

| | Parts |
|---|---|
| Copolymer solution (IV) | 750 |
| Butoxy methyl melamine resin [1] | 250 |
| Silicone resin: 1% solution [2] | 1 |

[1] Super Beckamine J–820 : Trademark, solids content : 50%, produced by Dainippon Ink and Chemical Inc.
[2] 1% xylene solution of a silicone resin produced by Dow Corning Co.

A coated panel was produced in the following manner

A coating material having a viscosity of 15 seconds by Ford cup #4 measurement prepared by diluting the above pigmented enamel with the coating thinner used in Example 3 was sprayed three times onto a steel plate at intervals of 90 seconds to obtain the pigmented film. In this case, the steel plate was previously treated with Bonderite #100 and then treated with an epoxy primer. The obtained pigmented film on the steel plate was kept at 25° C. for 2 minutes to obtain the dry pigmented film. The thickness of the layer was 18μ. After formation of a pigmented enamel layer by standing for 150 seconds, a clear coating material diluted with a thinner (viscosity; 20 seconds by Ford Cup #4) was applied to this enamel layer 3 times at intervals of 90 seconds and then the clear layer carried out at 25° C. for 15 minutes. The thickness of the film is 39μ. The obtained coating film was baked at 140° C. for 30 minutes. The properties of the obtained coated panel are shown in Table 1. It is clear that the coating film formed by the present invention has excellent properties.

Example 5

A clear coating material having a 20 second viscosity by Ford Cup #4 measurement was prepared by mixing the following materials.

| | Parts |
|---|---|
| Copolymer solution (VII) | 750 |
| Isobutoxy methyl melamine* (Trade-mark: U-ban 60R which concentration is 50% by weight) | 250 |
| 1% xylene solution of silicone resin (Surface active agent) | 1 |

* U-Ban 60R (produced by Mitsui Toatsu Chem. Co.)

The pigmented enamel used in Example 4 was applied to a steel plate treated with a primer. Then the above-described clear coating material was applied in the same manner as in Example 4. The thickness of the colored layer was 18μ and the thickness of clear layer was 37μ. The properties of the coated plate obtained by baking are shown in Table 1. It is clear from the results that the coating film obtained by the present invention is excellent.

Example 6

The pigmented enamel of Example 4 was used.
A clear coating material was prepared by mixing the following materials:

| | Parts |
|---|---|
| Copolymer solution (I) | 584 |
| Half second butyate (The solid content is 20% solution) | 312 |
| Methoxy methyl melamine resin (50% solution) | 104 |
| Silicone resin (Surface active agent which concentration is 1%) | 0.83 |

To the pigmented enamel film obtained by the same manner as in Example 4, the above coating material was applied in the same manner as in Example 4. The properties of the coating plate obtained by baking are shown in Table 1. The resulting coating film obtained in accordance with the present invention had excellent properties.

Example 7

A pigmented enamel was prepared by mixing the following materials:

| | Parts |
|---|---|
| Al-paste 1109 MA | 31 |
| Xylene | 129 |
| Copolymer solution (III) | 640 |
| Cellulose acetate butyrate EAB–531–1 (20% solution)* | 100 |
| Methoxy methyl melamine resin (60% solution) | 100 |

* EAB–531–1 was prepared in the same manner as the half second butyrate solution.

The obtained pigmented enamel had a solids content ratio of aluminum pigment: vehicle=1:20.
A clear coating material was prepared by mixing the following materials:

| | Parts |
|---|---|
| Copolymer solution (III) | 762 |
| 20% solution of cellulose acetate butyrate (Trademark: EAB–531–1) | 119 |
| Methoxy methyl melamine resin (The solid content is 60% by weight) | 119 |
| Silicone resin (Surface active agent which concentration is 1% by weight) | 1 |

Using the above pigmented enamel and the coating material, a finish coating film was produced by the same procedure as in Example 4. The properties of the resulting coating plate are shown in Table 1. It is clear from Table 1 that the finish coating film obtained in accordance with the present invention has excellent properties.

Example 8

A vehicle component of pigmented enamel contained the following materials:

| Vehicle compositions: | Parts |
|---|---|
| Copolymer solution (II) | 72.5 |
| Half second butyrate | 7.5 |
| Methoxy methyl melamine resin (which concentration is 60% by weight) | 20.0 |

The pigmented paste was prepared by mixing the following materials:
Aluminum powder: vehicle=1:20 (solids content).

| | Parts |
|---|---|
| Al-paste 1109 MA | 31 |
| Xylene | 106 |
| Copolymer solution (II) | 580 |
| Cellulose acetate butyrate (Half second butyrate which concentration is 20% by weight) | 150 |
| Methoxy methyl melamine resin (which concentration is 60% by weight) | 133 |

A clear coating material consist of the following component:

| Vehicle composition: | Parts |
|---|---|
| Copolymer solution (V) | 75 |
| Methoxy methyl melamine (Trademark: Super Beckamine J–820) | 25 |

The clear coating material was prepared by mixing the following materials:

| | Parts |
|---|---|
| Copolymer solution (V) | 750 |
| Butoxy methyl melamine (Trademark: Super Beckamine J–820) | 250 |
| Silicone DC #200 (1% solution) | 1 |

The above pigmented enamel and the clear coating material were applied onto a steel plate previously treated with an epoxy primer and then baked in the same manner as in Example 4. The properties of the obtained plate are shown in Table 1. As in clear from Table 1, the coated plate obtained in accordance with the present invention had excellent properties.

Example 9

Properties of the coated plate obtained as in Example 8 but using Copolymer solution (VI) in the clear coating material instead of Copolymer solution (V) are shown in Table 1. As is clear from this table, the coated plate obtained in accordance with the present invention had excellent properties.

Example 10

A vehicle composition of pigmented enamel contained the following materials:

Vehicle composition: Parts
Copolymer solution (I) _____ 70
Cellulose acetate butyrate (Half second butyrate of a concentration of 20% by weight) _____ 15
Methoxy methyl melamine resin solution (The concentration of which is 60% by weight) ___ 15

The above pigmented enamel was prepared by grinding the following materials with ball mill.

Parts
Titanium oxide (Trademark: Ti-paque R–820, produced by Ishihara Sangyo Kaisha Ltd.) _____ 80
Copolymer solution (I) _____ 100
Xylene _____ 20

After grinding for 48 hours, the following components were then added thereto.

Parts
Copolymer solution (I) _____ 110
Cellulose acetate butyrate (Half second butyrate the concentration of which is 20% by weight) _____ 75
Methoxy methyl melamine resin (60% solution) ___ 25
Xylene _____ 20

A coating material having a 20 seconds Ford cup #4 viscosity prepared by diluting the above-described white enamel with a thinner consisting of 20 parts of butyl acetate, 40 parts of xylene, 20 parts of butyl Cellosolve and 20 parts of Solvesso #150 was applied to a steel plate treated with an epoxy primer. After setting (standing), a clear coating material as was used in Example 4 was applied thereto, and the film was baked at 140° C. for 30 minutes.

The properties of the resulting coated plate are shown in Table 1. As is clear from Table 1, the coated plate obtained had excellent properties.

Comparison 1

A pigmented enamel as was used in Example 4 was diluted with a thinner to adjust the Ford cup #4 viscosity to 15 seconds. It was then applied 4 times at intervals of 90 seconds to a steel plate. The steel plate was previously treated with Bonderite #100 and then coated with an epoxy primer. The coated plate was cured at 140° C. for 30 minutes after setting (standing) for 15 minutes to produce a coating plate.

The properties of the coated plate thus obtained are shown in Table 1. As is clear from Table 1, the appearance and the properties of the coating film were inferior to those of the coating film produced by the present invention.

Comparison 2

A vehicle composition of metallic pigmented enamel contain the following materials:

Vehicle composition: Part
Copolymer solution (V) _____ 75
Butoxy methyl melamine resin (The concentration of which is 60% by weight) _____ 25

The above pigmented enamel was prepared by mixing the following materials:

Parts
Al-paste 1109 MA _____ 31
Xylene _____ 170
Copolymer solution (V) _____ 600
Butoxy methyl melamine resin (The concentration of which is 50% by weight) _____ 200
Silicone resin (the concentration of which is 1% by weight) _____ 1

The obtained metallic pigmented enamel was diluted with a thinner to a Ford cup #4 viscosity of 17 seconds. A coated plate was produced in the same manner as in Comparison 1.

The properties of the coated plate thus obtained are shown in Table 1. As in clear from Table 1, the appearance and chemical resistance were inferior to the coated plate obtained by the present invention.

Comparison 3

The pigmented enamel was prepared by mixing the following materials:

Parts
Al-paste 1109 MA _____ 31
Xylene _____ 100
Copolymer solution (VIII) _____ 580
Half second butyrate (20% solution) _____ 150
Methoxy methyl melamine (60% solution) _____ 133

The clear coating material used was the same as in Example 8.

The finish coating film was prepared as in Example 4 using the above pigmented enamel and the above clear coating enamel.

The properties of the coated plate are shown in Table 1. It is clear that the properties of this film are inferior compared with the properties of the film obtained in accordance with the present invention.

TABLE I

| Examination | Example | | | | | | | Comparison | | |
|---|---|---|---|---|---|---|---|---|---|---|
| | 4 | 5 | 6 | 7 | 8 | 9 | 10 | 1 | 2 | 3 |
| Copolymer for under coating enamel | I | I | I | III | II | II | I | I | V | VIII |
| Copolymer for clear top coating | IV | VII | I | III | V | VI | IV | | | V |
| Film thickness, μ: | | | | | | | | | | |
| Under coating | 30 | 27 | 30 | 26 | 29 | 30 | 30 | 41 | 40 | 30 |
| Top coating | 25 | 20 | 25 | 28 | 27 | 20 | 20 | | | 25 |
| Gloss (60°) | 95 | 92 | 96 | 100 | 97 | 98 | 100 | 83 | 90 | 93 |
| Appearance | 5 | 4 | 5 | 5 | 5 | 5 | 5 | 2 | 4 | 3 |
| Pencil hardness | H | H | H | 3H | 2H | 2H | 2H | 2H | H | 2H |
| Cross-cut test | 100/100 | 100/100 | 100/100 | 100/100 | 100/100 | 100/100 | 100/100 | 100/100 | 100/100 | 98/100 |
| Impact resistance, cm | 25 | 30 | 30 | 25 | 30 | 25 | 30 | 25 | 25 | 20 |
| Erichsen value, mm | 5.9 | 6.2 | 6.7 | 1.8 | 3.1 | 4.5 | 6.4 | 3.1 | 3.7 | 4.5 |
| Xylene resistance | 4 | 4 | 4 | 4–5 | 4 | 4–5 | 4 | 4 | 4 | 4 |
| Gasoline resistance after— | | | | | | | | | | |
| 2 hrs | HB | HB | B | F | HB | F | F | F | B | HB |
| 24 hrs | F | F | HB | H | F | H | H | H | HB | F |
| Acid resistance | 5 | 5 | 5 | 5 | 5 | 5 | 5 | 3–4 | 4 | 5 |
| Battery solution resistance | 5 | 4 | 5 | 5 | 5 | 5 | 5 | 3 | 4 | 5 |
| Alkali resistance | 5 | 4–5 | 5 | 5 | 5 | 5 | 5 | 3 | 3–4 | 5 |
| Stain resistance (soot) | 4 | 4 | 5 | 5 | 5 | 5 | 5 | 4 | 4 | 5 |
| Gloss after exposure | 93 | 87 | 95 | 100 | 95 | 90 | 98 | 71 | 72 | 78 |
| Gloss retention after exposure (percent) | 98 | 95 | 99 | 100 | 98 | 92 | 98 | 85 | 80 | 84 |
| Appearance after exposure | 5 | 4 | 5 | 5 | 5 | 5 | 5 | 3 | 4 | 3 |

The examinations in Table 1 were carried out by the following methods.

Thickness of film: Measured with an electromagnetic Thickness meter (average value)

Gloss (60°): Measured by the 60° mirror reflection method.

Appearance: expressed by a 5-grade visual measurement (1 means the worst, 5 means the best)

Cross cut: The percentage of the number of squares remaining of the coating film when the squares of 2 mm. are drawn on the coating film and peeled off with a cellophane tape.

Impact resistance: The value of the impact resistance shows the height of an iron ball at which defects of the coating film are caused by perpendicularly dropping an iron ball ½ inch in diameter which weighs 500 g. onto the coating film.

Erichsen value: The value shows the mm. of length extruded at which defects of the films are caused by extrusion of the coating film by means of an Erichsen testing machine.

Xylene resistance: Expressed by a 5-grade visual measurement, namely the state of the coating film when it is rubbed 8 times by hand with a flannel cloth impregnated with xylene.

Gasoline resistance: The pencil hardness of the coating film dipped into a mixture of petroleum benzene/toluene (9/1 ratio by volume) at 20° C. for 24 hours, and thereafter allowed to stand for 2 hours and 24 hours.

Acid resistance: A 5-grade visual examination of the damage to the coating film when a spot of a 0.1N sulfuric acid solution is laid on the surface of the coating film at 20° C. for 24 hours.

Battery solution resistance: Carried out in the same manner as for the determination of acid resistance but using a 6.7N sulfuric acid solution.

Alkali resistance: A 5-grade visual examination of the degree of damage to the coating film when a 0.1N caustic soda solution is laid on the surface of the coating film at 55° C. for 4 hours.

Stain resistance (soot): Carried out in the same manner for the test of alkali resistance but using a blended mixture of soot obtained by the combustion of heavy oils and a heavy oil in a ratio of 1/1 by weight.

Gloss retention after exposure: The gloss retention ratio is obtained by measuring gloss (60°) after exposure to the sun for 18 months at an angle of 45° facing south at Otake in Hiroshima, Japan.

Appearance after exposure: A 5-grade visual examination.

What is claimed is:

1. In the process of forming exterior finish coating films on the body of a car which comprises applying a pigmented enamel consisting essentially of a thermosetting acrylic resin composition (I) and a coloring pigment (II) to a substrate treated with a primer, setting the pigmented enamel, applying a thermosetting acrylic resin composition (III) onto the set pigmented enamel and thereafter baking the coated substrate at a temperature and for a time sufficient to crosslink said thermosetting resins, wherein the improvement comprises: said thermosetting acrylic resin composition (I) consists essentially of (A) about 40 to about 90 parts by weight of a thermosetting acrylic copolymer having
(a) about 4–30 percent by weight of a carboxylic acid hydroxyalkyl ester structural unit in which the hydroxyalkyl group has 1 to 8 carbon atoms,
(b) about 1 to 15 percent by weight of a carboxylic acid amide structural unit in which at least one hydrogen atom of the amide is substituted by a group represented by the formula

wherein R and $R_1$ represent hydrogen or lower alkyl having 1 to 8 carbon atoms, (c) about 0.1 to 10 percent by weight of a carboxylic acid structural unit and
(d) about 45 to 94.9 percent by weight of at least one vinyl monomer structural unit different than (a), (b) and (c), (B) about 4 to 50 parts by weight of an aminoplast resin; and
(C) about 2 to 30 parts by weight of a cellulose acetate butyrate, in which the total amount of (A), (B) and (C) are 100 parts by weight;

said thermosetting acrylic resin composition (III) consists essentially of (D) about 40 to 96 parts by weight of a thermosetting acrylic copolymer having
(a) about 4–30 percent by weight of a carboxylic acid hydroxyalkyl ester structural unit in which the hydroxyalkyl group has 1 to 8 carbon atoms;
(b) about 15 percent by weight or less of a carboxylic acid amide structural unit in which at least one hydrogen atom of the amide is substituted by a group represented by the formula

wherein R and $R_1$ are as defined above,
(c) about 0.1 to 10 percent by weight of a carboxylic acid structural unit and
(d) about 45 to 95.9 percent by weight of at least one vinyl monomer structural unit different than (a), (b) and (c), (E) about 4 to 50 parts by weight of an aminoplast and
(F) 30 parts by weight or less of a cellulose acetate butyrate, in which the total amount of (D), (E) and (F) is 100 parts by weight.

2. The process of claim 1 wherein the carboxylic acid hydroxyalkyl ester structural unit (a) in thermosetting acrylic copolymers (A) and (D) is a monoester of an α-β-monoethylenic unsaturated carboxylic acid and a polyol.

3. The process of claim 2 wherein the α-β-monoethylenic unsaturated carboxylic acid is a monocarboxylic acid.

4. The process of claim 3 wherein the carboxylic acid is selected from the group consisting of acrylic acid, methacrylic acid, itaconic acid, α-methylene glutaric acid, glutaric acid, maleic acid and fumaric acid, and the polyol is selected from the group consisting of ethylene glycol, propylene glycol, 1,2-propylene glycol, 1,3-butane diol, 1,4-butane diol, 2-ethylhexylene glycol, 1-hexylpropane diol and 2,3-dihydroxpropanol.

5. The process of claim 1 wherein the carboxylic acid amide structural unit (b) in thermosetting acrylic copolymers (A) and (D) is a member selected from the group consisting of acrylamide, methacrylamide, itaconic acid amide, α-methylene glutaric acid amide, crotonic acid amide, fumaric acid amide, α-ethylacrylamide, N-methylol compounds of these carboxylic acid amides and alkoxylated compounds of said carboxylic acid amides.

6. The process of claim 1 wherein the carboxylic acid structural unit (c) in thermosetting acrylic copolymers (A) and (D) is an α-β-monoethylenically unsaturated carboxylic acid.

7. The process of claim 6 wherein said α-β-monoethylenically unsaturated carboxylic acid is selected from the group consisting of acrylic acid, methacrylic acid, maleic acid, fumaric acid, itaconic acid, α-methylene glutaric acid and aconitic acid.

8. The process of claim 1 wherein the vinyl monomer is a monoester obtained by reacting an α-β-monoethylencially unsaturated carboxylic acids with a monohydric alcohol.

9. The process of claim 8 wherein the α-β-monoethylenically unsaturated carboxylic acid is selected from the group consisting of acrylic acid, methacrylic acid, maleic acid, itaconic acid, α-methylene glutaric acid and aconitic acid.

10. The process of claim 9 wherein the monohydric alcohol is selected from the group consisting of methanol, ethanol, n-propanol, iso-propyl alcohol, n-butanol, iso-butanol, t-butanol, pentanol, 2-ethylhexanol, cyclohexanol, nonyl alcohol, decyl alcohol, dodecyl alcohol, stearyl alcohol and benzyl alcohol.

11. The process of claim 1 wherein the vinyl monomer is selected from the group consisting of acrylonitrile, methacrylonitrile, vinyl acetate, vinyl proprionate, versatic acid vinyl ester, styrene, $\alpha$-methylstyrene, $\alpha$-chlorosytrene and vinyl toluene.

12. The process of claim 1 wherein the aminoplast resins (B) and (E) are N-alkoxyalkyl melamine resins.

13. The process of claim 1 wherein the aminoplast resins (B) and (E) are selected from the group consisting of methylated and butyrated melamine resins.

14. The process of claim 1 wherein the cellulose acetate butyrates (C) and (F) have a viscosity of 0.1–2.0 seconds determined by ASTM D–871–48.

15. The process of claim 1 wherein the thermosetting acrylic resin composition (III) is clear.

16. The process of claim 1 wherein R and $R_1$, if lower alkyl, have 1–4 carbon atoms.

17. The process of claim 1 wherein said setting is at room temperature to 100° C. for 1–10 minutes.

18. The process of claim 17 wherein the pigmented enamel which is applied provides a layer, after setting, of 5–50$\mu$ thickness.

19. The process of claim 18 wherein the applied thermosetting acrylic resin composition (III) is set at room temperature to 100° C. for 5–15 minutes, and then the baking is conducted at 100–200° C. for 15–30 minutes.

20. The process of claim 19 wherein any setting is at below 100° C.

References Cited
UNITED STATES PATENTS

| | | | |
|---|---|---|---|
| 3,422,042 | 1/1969 | Porter | 260—15 |
| 3,531,525 | 9/1970 | Hoke et al. | 260—80.73 X |
| 3,647,546 | 1/1972 | Parker | 260—15 |
| 3,671,293 | 6/1972 | Walle | 117—74 |
| 3,657,001 | 4/1972 | Parker | 117—132 BF |
| 3,198,654 | 8/1965 | Porter | 117—132 BF |
| 3,530,167 | 9/1970 | Dowbenko | 260—80.73 X |

WILLIAM D. MARTIN, Primary Examiner

H. J. GWINNELL, Assistant Examiner

U.S. Cl. X.R.

260—15, 17, 39, 41, 851